United States Patent [19]
Ghoneim et al.

[11] Patent Number: 5,258,912
[45] Date of Patent: Nov. 2, 1993

[54] WHEEL UNDERSTEER SPEED CONTROL

[75] Inventors: Youssef A. Ghoneim, Mt. Clemens; William Chin-Woei Lin, Troy, both of Mich.

[73] Assignee: General Motors Corporation, Detroit, Mich.

[21] Appl. No.: 720,071

[22] Filed: Jun. 24, 1991

[51] Int. Cl.$^5$ .................. H02P 5/46; B62D 11/02
[52] U.S. Cl. .................. 364/424.05; 180/141; 180/142; 180/143; 180/6.48; 180/6.28; 180/6.2
[58] Field of Search .................. 364/424.05, 424.02, 364/426.02; 180/197, 141, 142, 143, 6.28, 6.5, 6.2, 6.48; 280/91

[56] References Cited
U.S. PATENT DOCUMENTS

| | | | |
|---|---|---|---|
| 2,798,565 | 7/1957 | Rosenthal et al. | 180/6.5 |
| 3,190,387 | 6/1965 | Dow | 180/65 |
| 3,288,232 | 11/1966 | Shepherd | 180/1 |
| 3,362,493 | 1/1968 | Davis et al. | 180/6.32 |
| 3,368,425 | 2/1968 | Lewis | 74/720.5 |
| 3,592,280 | 7/1971 | Wappler et al. | |
| 3,756,335 | 9/1973 | Eisele et al. | 180/6.28 |
| 3,870,935 | 3/1975 | Abels et al. | 318/52 |
| 4,449,598 | 5/1984 | Hönes et al. | 180/6.5 |
| 4,471,273 | 9/1984 | Melocik et al. | 318/55 |
| 4,571,010 | 2/1986 | Dittner et al. | 303/110 |
| 4,589,511 | 5/1986 | Leiber | 180/197 |
| 4,807,943 | 2/1989 | Ogino | 303/113 |
| 4,842,089 | 6/1989 | Kimbrough et al. | 180/79.1 |
| 4,946,015 | 8/1990 | Browalski et al. | 192/1.23 |
| 4,949,823 | 8/1990 | Coutant et al. | 192/4 C |

Primary Examiner—Thomas G. Black
Assistant Examiner—Julie D. Day
Attorney, Agent, or Firm—Anthony Luke Simon

[57] ABSTRACT

An apparatus provides improved vehicle handling during turning maneuvers by providing control of vehicle understeer. The understeer control includes determining a desired turning radius for the vehicle, a corresponding ideal outer to inner wheel speed ratio. A closed loop torque command is determined in proportion to the difference between the ideal wheel speed ratio and the actual wheel speed ratio. The closed loop torque command is used in conjunction with an open loop torque command responsive to operator power demand to provide wheel speed control in a manner to maintain the desired vehicle understeer characteristics.

8 Claims, 7 Drawing Sheets

WHEEL UNDERSTEER SPEED CONTROL

This invention pertains to vehicle handling control and more particularly to control of drive wheels of a vehicle for improved performance and maintain desired vehicle understeer characteristics during vehicle turning.

BACKGROUND OF THE INVENTION

Vehicle operators prefer a close correspondence between steering wheel angle and vehicle steering. However, depending upon the characteristics of the vehicle, the vehicle may tend to have an increased understeer, so the operator must turn the steering wheel more to get the vehicle to properly turn. The vehicle may also oversteer, requiring the operator to turn the steering wheel less for the vehicle to properly turn. When steering a vehicle, the speed of the driven wheels of the vehicle can affect vehicle steering performance to deviate from its pre-set understeer characteristics.

When a vehicle turns, the wheels closest to the center of the turning radius are referred to as the inner wheels and the wheels farthest from the center of the turning radius are referred to as the outer wheels. Referring to FIG. 1, the vehicle 12 has four wheels 14, 18, 22, and 20, a wheel base L, and each wheel has a distance d from the center line 17 of the vehicle. The vehicle is shown with front wheels 18 and 20 turned so the vehicle makes a right turn such that the center of gravity 16 of the vehicle 12 turns at a radius R around the center of the turn 24. In this example, wheels 20 and 22 are inside wheels and wheels 18 and 14 are the outside wheels. When the vehicle turns left, wheels 18 and 14 are the inside wheels and wheels 20 and 22 are the outside wheels.

An operator negotiates a turn which has a turning radius of $R_d$ by rotating the vehicle steering wheel. However, if vehicle understeer characteristics (note: "understeer characteristics" may infer both understeer and oversteer depending on the sign) deviate from the vehicle's nominal setting, the actual turning radius of the vehicle, R, varies from the desired turning radius, $R_d$. Vehicle understeer occurs when the steering wheel is turned a specific amount, indicating a desired steering radius $R_d$, but the actual steering radius, R, is greater than $R_d$. Vehicle understeer is characterized by an understeer coefficient $K_u$, which is a function of the static normal load on the front and rear tires and the cornering stiffness of the tires. An understeer coefficient $K_u>0$ occurs during vehicle understeer, and is considered stable, however, it is not desirable to have a very large understeer coefficient.

Vehicle oversteer occurs when the steering wheel is turned to a specific amount, indicating a desired steering radius $R_d$, but the actual steering radius, R, decreases as vehicle speed increases. This is considered an undesirable trait, and occurs when the understeer coefficient $K_u$ is less than zero.

Because the cornering stiffness of a given tire varies with a number of operational parameters including inflation pressure, normal load, braking effort, and lateral force, the understeer coefficient $K_u$ varies with the operating conditions of the vehicle. Therefore is is important to maintain the effective understeer coefficient within a certain desired level, $0 \leq K_u \leq k_d$, to provide stable and consistent vehicle behavior, allowing the driver to direct the vehicle without excessive steering.

SUMMARY OF THE PRESENT INVENTION

This invention provides a control system for a vehicle to achieve the desired turning radius by controlling the outer to inner wheel speed ratio $w_o/w_i$ to a desired value of $(R_d+d)/(R_d-d)$. The desired steering radius, $R_d$, is calculated to allow an acceptable amount of understeer, maintaining the vehicle understeer coefficient substantially at a desired value, $K_{ud}$.

This invention may be implemented on vehicles of which the left and right wheel torques at each driven axle can be independently controlled either by having independent drive-by-wire power trains for right and left wheels or by having a single powertrain and a brake modulator, such as an anti-spin brake actuator. By controlling the wheel speed ratio, the vehicle is kept on a reference path in response to a steering input by the driver.

Structurally, this invention comprises, means for measuring vehicle speed, means for measuring an operator steering angle, means for measuring operator desired output torque, means for determining an open loop torque command in response to the operator desired output torque, means for measuring wheel speeds of driven wheels, means for determining a desired turning radius, $R_d$, in response to the measured vehicle speed and the operator steering angle, means for determining a desired inner and outer wheel speed ratio, means for determining a closed loop torque command for each wheel in response to (i) a previously determined closed loop torque command, (ii) the desired turning radius, and (iii) the wheel speeds of the driven wheels, and means for driving the each wheel at an output torque equal to the sum of the open loop torque command and the closed loop torque command for that wheel whereby desired vehicle understeer characteristics are maintained, improving vehicle handling during turning maneuvers.

DETAILED DESCRIPTION OF THE INVENTION

Figure 1:
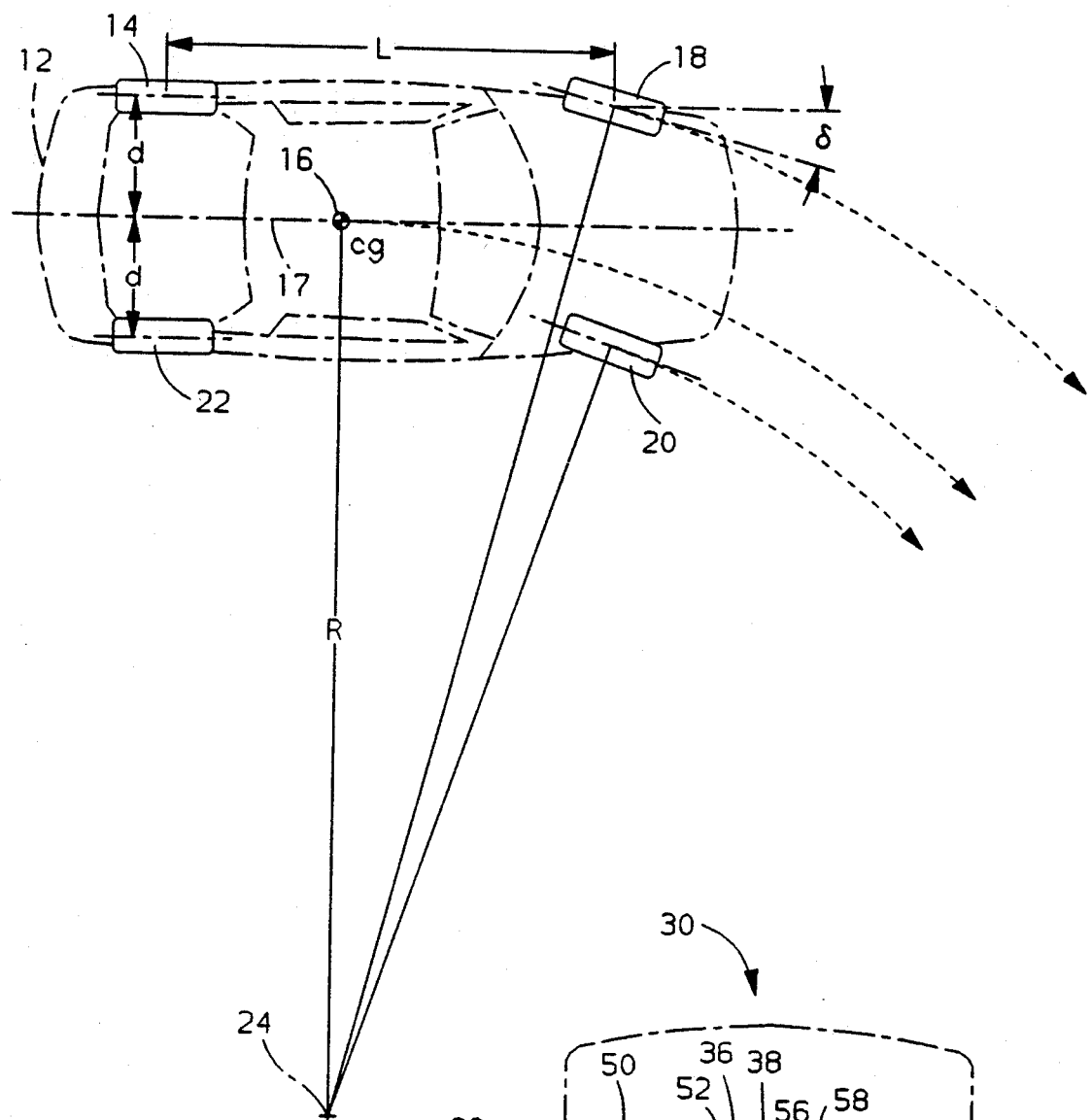
FIG. 1 is a schematic illustration of a vehicle steered to turn.
Figure 2:
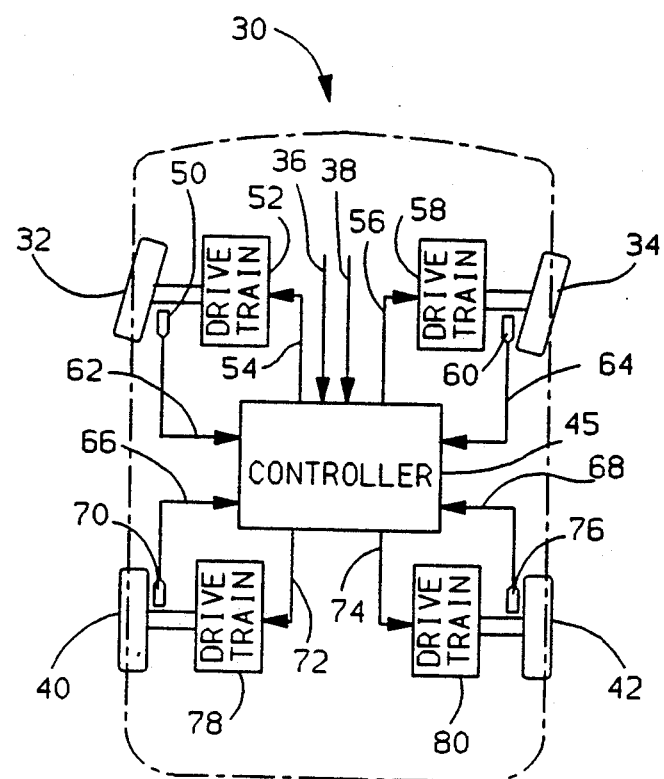
FIG. 2 is a schematic illustration of a vehicle with a motor and drive train for each wheel for implementation of this invention.

FIG. 2 is one example of an implementation of this invention. Referring to FIG. 2, vehicle 30 includes front steering wheels 32 and 34, rear wheels 40 and 42, drive trains 52, 58, 78 and 80 driving the four wheels, and controller 45 controlling the drive trains 52, 58, 78 and 80. Each of the drive trains 52, 58, 78, and 80 is preferably a brushless DC motor utilizing rare earth permanent magnets, preferably iron-neodynium-baron magnets, available under the trade name "Magnaquench" (Registered Trademark) from Delco Remy Division of General Motors Corporation. In response to an accelerator pedal signal on line 36, which serves as an indication of operator desired output torque for drive trains 52, 58, 78 and 80, controller 45 determines an open loop torque command for each drive train.

Individual wheel speeds and a measure of the vehicle speed are determined by controller 45 in response to signals sensed by sensors 50, 60, 70 and 76 and fed to controller 45 through lines 62, 64, 66 and 68. In response to the wheel speed signals and a steering wheel angle signal, indicative of the operator steering angle of the vehicle steering wheel, on line 38, controller 45 determines the desired turning radius, $R_d$, of the vehicle, such that:

$$R_d = (L + K_{ud}V^2)/\delta, \quad (1)$$

where V is the vehicle velocity, $K_{ud}$ is the desired understeer coefficient, L is the distance between the front and rear wheels of the vehicle, and $\delta$ is the steering angle. The controller 45 also determines the desired outer to inner wheel speed ratio, $D = (R_d + d)/(R_d - d)$, where d is the distance from the center line of the vehicle to the inside and outside wheels. The vehicle velocity V can be approximated from a measure of the outer and inner front wheel speeds $\omega_{of}$ and $\omega_{if}$ where $V = (w_{of} + w_{if})/2$. Alternative measurements of vehicle velocity can be obtained from a vehicle tachometer signal, or a speed signal of a non-driven wheel. In the illustration, the vehicle is shown turning right, with wheels 34 and 42 being the inner wheels and wheels 32 and 40 being the outer wheels.

The controller 45 determines a closed loop torque command for each drive train in response to the desired wheel speed ratio, D, and the actual wheel speed ratios, $\omega_{of}/\omega_{if}$ (front) and $\omega_{or}/\omega_{ir}$ (rear). The closed loop torque commands for the inner wheels 34 and 80 are computed as:

$$T_{if}(t) = T_{if}(t - \Delta t) + K_p(D - \omega_{of}/\omega_{if}), \text{ and} \quad (2)$$

$$T_{ir}(t) = T_{ir}(t - \Delta t) + K_p(D - \omega_{or}/\omega_{ir}), \quad (3)$$

where $T_{if}(t)$ and $T_{ir}(t)$ are the closed loop torque commands for the inner front and rear wheels, $\Delta t$ is the time interval of the control loop, e.g., 10 ms., $T_{if}(t - \Delta t)$ and $T_{ir}(t - \Delta t)$ are the previously determined closed loop torque commands for the inner front and rear wheels, determined at time $(t - \Delta t)$, $K_p$ is a feedback gain constant, and $\omega_{or}$ and $\omega_{ir}$ are the outer and inner rear wheel speeds. The closed loop torque commands, $T_{of}(t)$ and $T_{or}(t)$, for the front and rear outer wheels 32 and 40 are set to zero.

The controller 45 then sums the closed loop torque command and the open loop torque command for each drive train such that:

$$\tau_{if} = T_p - T_{if}(t), \quad (4)$$

$$\tau_{ir} = T_p - T_{ir}(t), \quad (5)$$

$$\tau_{of} = T_p - T_{of}(t), \text{ and} \quad (6)$$

$$\tau_{or} = T_p - T_{or}(t), \quad (7)$$

where $\tau_{if}$ and $\tau_{ir}$ are the inner front and inner rear torque commands fed to the drive trains 58 and 80 through lines 56 and 74 and $\tau_{of}$ and $\tau_{or}$ are the outer front and outer rear torque commands fed to drive trains 52 and 78 through lines 54 and 72.

In the event that the vehicle is turning left, wheels 32 and 40 are the inner wheels and wheels 34 and 42 are the outer wheels.

The above control scheme is ideal for a variety of types of vehicles, especially electric vehicles. The individual torque control of each drive train translates to speed control of each wheel of the vehicle. Through the control provided by this invention, the inner and outer wheel speed ratio is maintains at substantially the ideal wheel speed ratio, D, maintaining vehicle understeer within desired bounds and eliminating vehicle oversteer.

Figure 3:
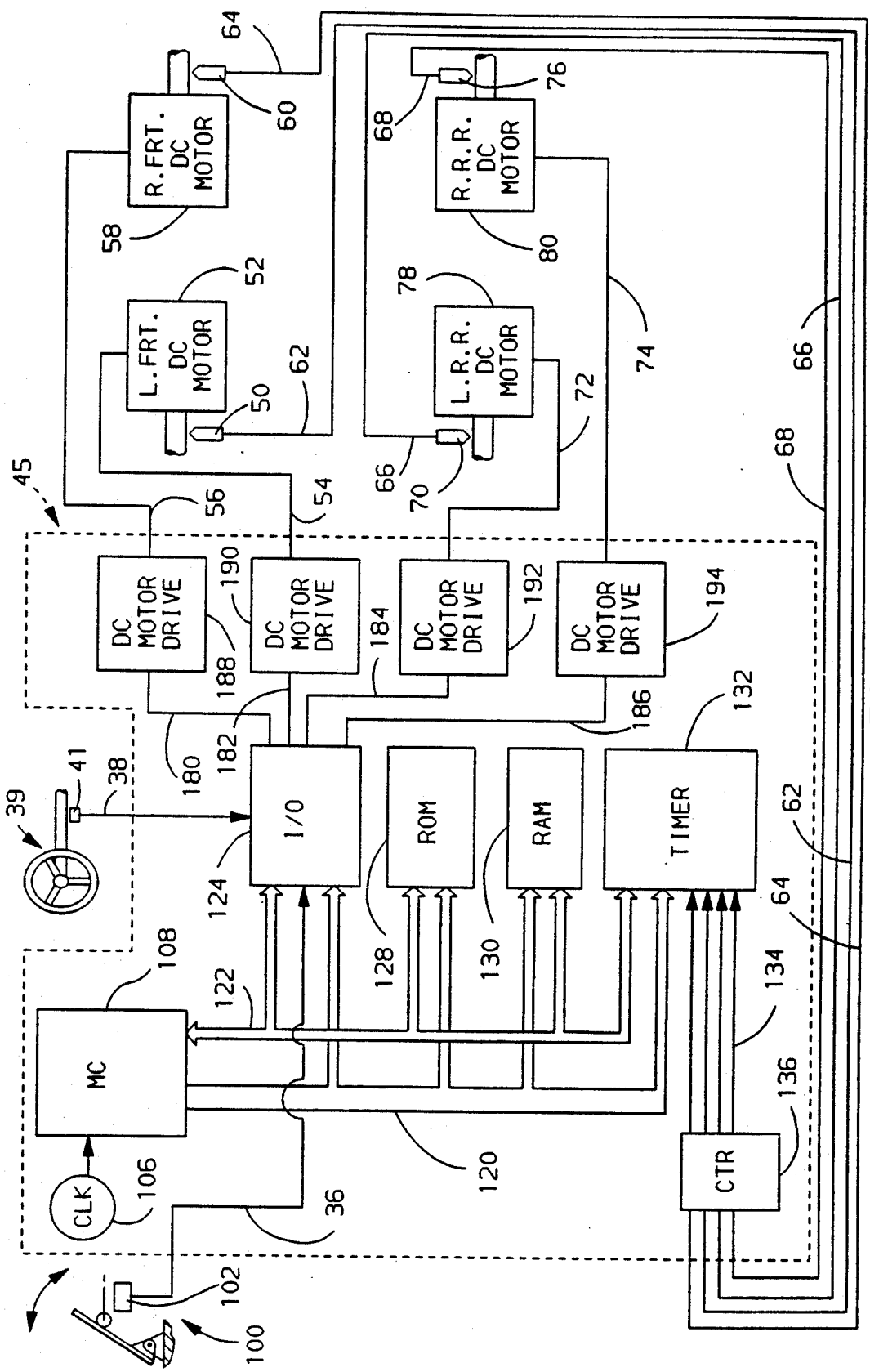
FIG. 3 is a schematic illustration of the controller and apparatus for the vehicle of FIG. 2.

Referring to FIG. 3, the controller 45 includes the clock 106, microcomputer 108, DC motor drivers 188, 190, 192 and 194, input/output unit 124, ROM and RAM memory units 128 and 130, timer 132 and counter 136. The microcomputer 108 executes the control program stored in read only memory 128 at a frequency determined by clock 106. The microcomputer controls the input/output unit 124, ROM 128, RAM 130 and timer 132 through control bus 120 and transfers data between the units through bidirectional data bus 122.

The accelerator pedal 100 has a position sensed by sensor 102, which may be a potentiometer, optical encoder, or any other suitable position sensor. A signal representative of the accelerator pedal position is input to the input/output unit 124 through line 36 and a number representative of the accelerator pedal position is stored in the RAM 130.

Steering wheel and shaft 39 has a position sensed by sensor 41, which may also be a potentiometer, optical encoder, or any other suitable position sensor. A signal representative of the steering wheel position is fed to input/output unit 124 through line 38 and a number representative of the steering wheel angle is stored in RAM 130.

The counter 136 receives four inputs from the four sensors 50, 60, 70, and 76 through lines 62, 64, 66, and 68, respectively. The counter 136 keeps track of the number of rotations of the four wheels and feeds that information to the timer 132 through lines 134. The information provided by counter 136 and timer 132 is used by microcomputer 108 to compute the speed of each wheel and, if necessary, compute an approximate speed of the vehicle by averaging two or four of the wheel speeds.

Using the wheel speed information, vehicle speed information, steering angle information, and accelerator pedal information, microcomputer 108 determines the open loop torque command and a closed loop torque command for each drive train as described below. Microcomputer 108 then computes the torque commands $T_{rf}, T_{rr}, T_{lf}$ and $T_{lr}$, for the right front, right rear, left front, and left rear wheels as described below and outputs those commands through lines 180, 182, 184 and 186 to DC motor drivers 188, 190, 192 and 194, controlling the DC motors for each drive train 52, 58, 78 and 80.

Figure 4:
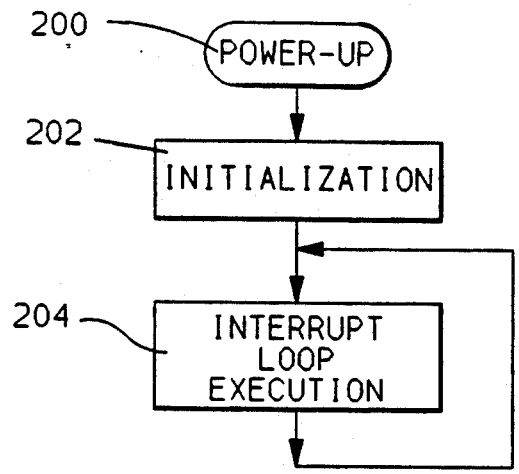
FIG. 4 is a general flow diagram for a computer implementation of this invention.

Referring to FIG. 4, the control program implemented by the microcomputer is powered up and initialized, 200 and 202, when the vehicle operator turns the ignition key. During execution of the initialization routine, various variables are reset, including the counter contents, steering wheel angle signal and closed loop torque commands. Additionally, the necessary start-up sequences for operation of the microcomputer, which are well known to those skilled in the art, are performed. After initialization, the microcomputer enters the control loop 204 to execute the algorithms based on a predetermined interrupt interval, preferably 10 ms ($\Delta t = 10$ ms).

Figure 5:
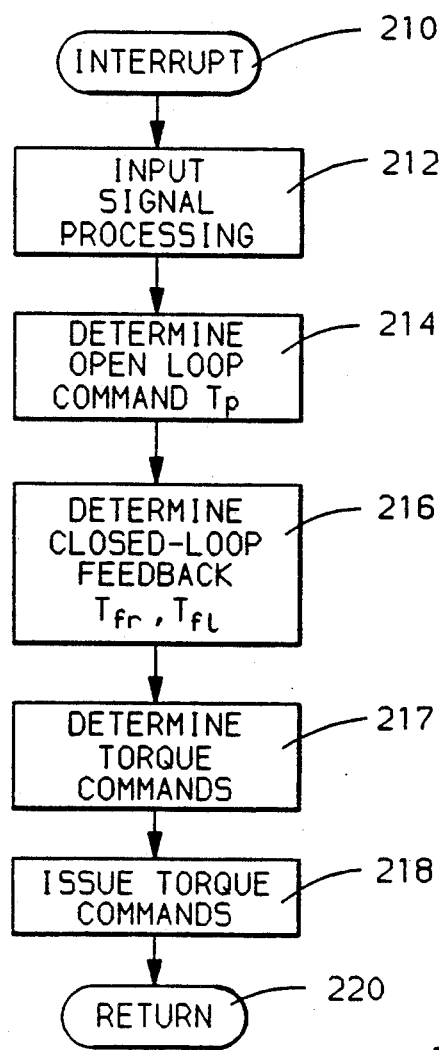
FIG. 5 is a flow diagram of a computer implementation of the torque control of this invention.

Referring to FIG. 5, the microcomputer enters the interrupt routine at step 210 and at step 212, receives input signals from the accelerator pedal sensor 102 (FIG. 3), steering wheel sensor 41, counter 136 and timer 132 and performs input signal processing. At step 214, the open loop torque command, $T_p$, is determined in response to the accelerator pedal position. The open loop torque command is usually directly proportional to accelerator pedal position but different transfer functions between the accelerator pedal position and open loop torque command may be designed, e.g., as a function of vehicle speed, to achieve particular vehicle performances. For example, large torque output may be desired when the accelerator pedal is initially depressed so that the vehicle "jumps" at initial acceleration, and this can easily be programmed into the open loop torque command control by one skilled in the art.

At step 216, the closed loop torque commands, $T_{rf}(t)$, $T_{rr}(t)$, $T_{lf}(t)$ and $T_{lr}(t)$, for the right front, right rear, left front and left rear drive trains are determined as described below. At step 218, the torque commands, $\tau_{rf}$, $\tau_{rr}$, $\tau_{lf}$ and $\tau_{lr}$, which are determined at step 217 as described below, are output to control the right front, right rear, left front and left rear drive trains 58, 80, 52 and 78 to control wheel speed during vehicle turning maneuvers. At step 220, the program returns out of the interrupt loop.

Figure 6:
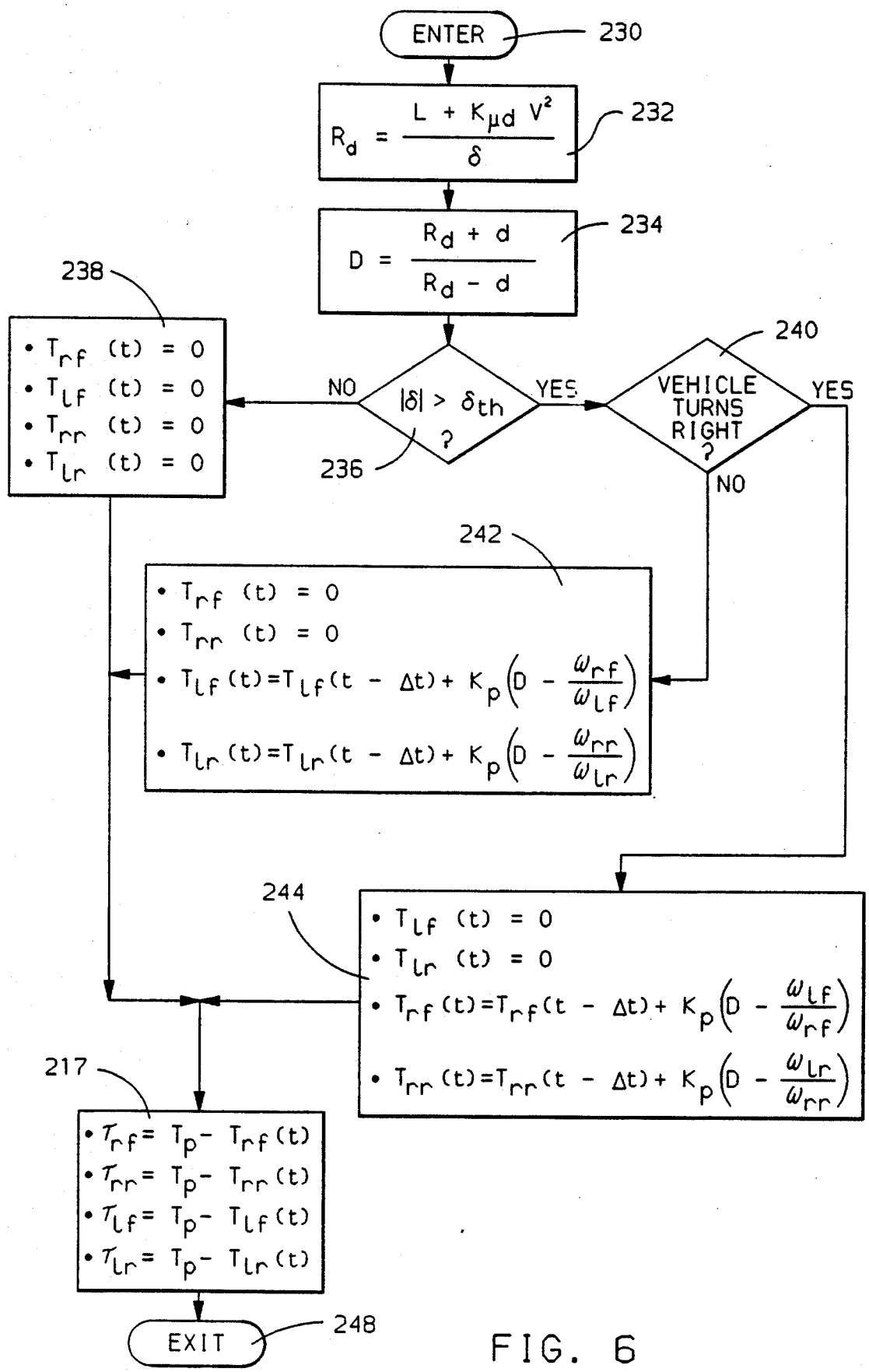
FIG. 6 is a detailed flow diagram of a computer implementation for determining the torque commands in implementation of this invention.

Referring to FIG. 6, the preferred implementation for determining the closed loop torque commands starts at block 230. At block 232, the desired turning radius, $R_d$ is determined according to equation (1) above. At block 234, the desired wheel speed ratio, D, is determined such that $D = (R_d + d)/(R_d - d)$. Block 236 determines whether the absolute value (magnitude) of the steering wheel angle, $\delta$, is greater than a threshold value, $\delta_{th}$, e.g., $\delta_{th} = 5$ degrees. If the steering wheel angle $\delta$ is not greater than the threshold value $\delta_{th}$, no understeer correction is applied. Correspondingly, the closed loop torque commands $T_{fr}(t)$, $T_{fl}(t)$, $T_{rr}(t)$ and $T_{rf}(t)$ are set to zero at box 238.

If the steering wheel angle $\delta$ is greater than $\delta_{th}$, block 240 tests to determine if the vehicle is turning right or left. The right turn/left turn test is easily implemented. For example, if the steering wheel angle sensor 41 is a potentiometer, the right turn/left turn determination at block 240 is simply a function of whether the signal on line 38 is greater than or less than the reference signal that occurs on line 38 when the steering wheel is centered (zero degree turn). This is just one example implementation and other implementations for other types of sensors are easily accomplished by those skilled in the art.

If the signal on line 38 indicates that the vehicle is turning left, the microcomputer moves to block 242. At block 242, the closed loop torque commands $T_{rf}(t)$ and $T_{rr}(t)$ for the right front and right rear drive trains, which are for the outside wheels, are set to zero. Block 242 determines the closed loop torque commands $T_{lf}(t)$ and $T_{lr}(t)$ for the left front and left rear drive trains, which are for the inside wheels, as follows:

$$T_{lf}(t) = T_{lf}(t - \Delta t) + K_p(D - \omega_{rf}/\omega_{lf}), \text{ and} \quad (8)$$

$$T_{lr}(t) = T_{lr}(t - \Delta t) + K_p(D - \omega_{rr}/\omega_{lr}). \quad (9)$$

If the signal on line 38 indicates that the vehicle is turning right, the microcomputer moves to block 244, where the left wheels are the outside wheels and the right wheels are the inside wheels. At block 244, the closed loop torque commands $T_{lf}(t)$ and $T_{lr}(t)$ for the left front and left rear drive trains are set to zero. Block 244 determines the closed loop torque commands $T_{rf}(t)$ and $T_{rr}(t)$ for the right front and right rear drive trains, which are for the inside wheels, as follows:

$$T_{rf}(t) = T_{rf}(t - \Delta t) + K_p(D - \omega_{lf}/\omega_{rf}), \text{ and} \quad (10)$$

$$T_{rr}(t) = T_{rr}(t - \Delta t) + K_p(D - \omega_{lr}/\omega_{rr}), \quad (11)$$

At block 217, the microcomputer sums the open loop torque commands and the closed loop torque commands to determine the torque commands, $\tau_{rf}$, $\tau_{rr}$, $\tau_{lf}$ and $\tau_{lr}$, for the right front, right rear, left front and left rear drive trains, as follows:

$$\tau_{rf} = T_p - T_{rf}(t), \quad (12)$$

$$\tau_{rr} = T_p - T_{rr}(t), \quad (13)$$

$$\tau_{lf} = T_p - T_{lf}(t), \text{ and} \quad (14)$$

$$\tau_{lr} = T_p - T_{lr}(t), \quad (15).$$

At block 248, the microcomputer exits the routine for determining the torque commands.

In the above example, four drive trains drive the four wheels of the vehicle, and the wheels are controlled during turning maneuvers to control vehicle understeer. In another example, this invention can be implemented into a two wheel drive vehicle where, for example, only the front wheels are driven by drive trains in a manner similar to the implementation described above. The only difference being that the drive trains and sensors for the rear wheels are not present and that the microcomputer only computes two torque commands, the commands for the front two wheels. In addition, the vehicle velocity may be approximated by averaging the two front wheel velocity signals, instead of all four. One other alternative in the implementation of a two-wheel-drive configuration is to have rear wheel speed sensors for more accurate vehicle speed measurement.

Figure 7A:
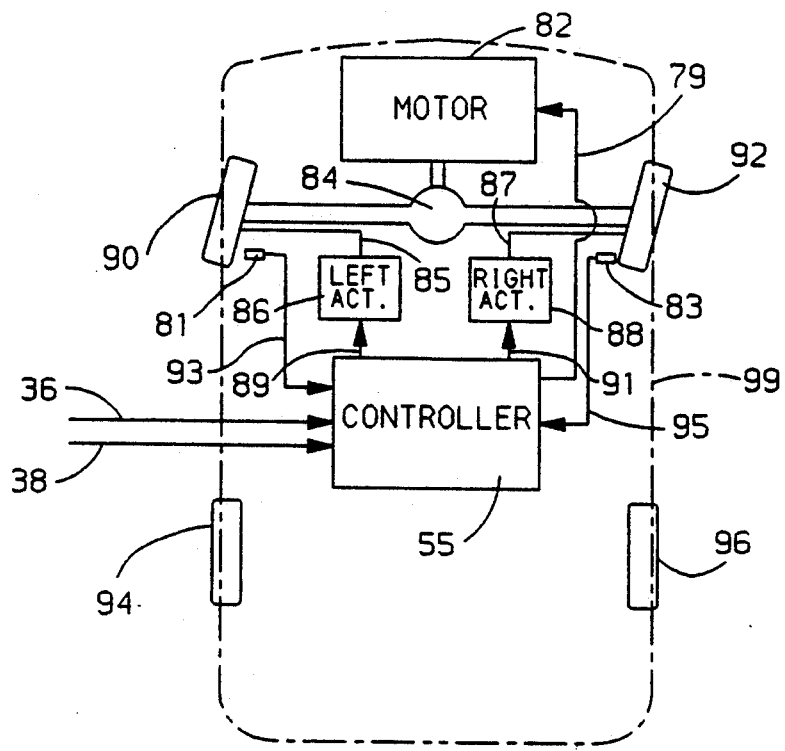
FIGS. 7a and 7b are schematic illustrations of vehicles with a single motor powering two drive wheels through a differential for implementation of this invention.
Figure 7B:
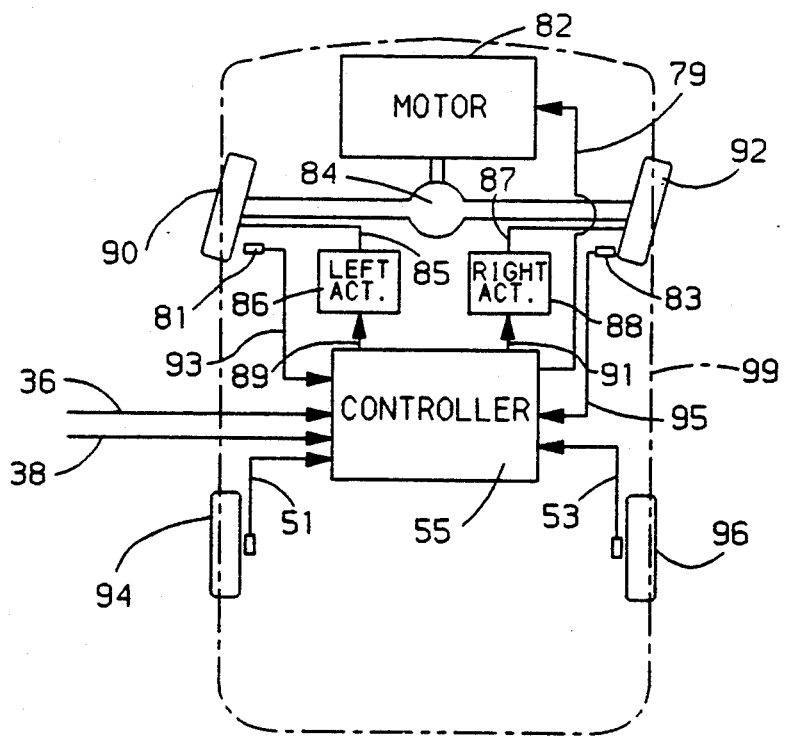

FIG. 7 illustrates another example implementation of this invention, suitable for implementation into conventional front wheel drive vehicles. In the example, the vehicle 99 includes wheels 90, 92, 94 and 96 and has front engine and transmission 82 providing motive force through differential 84 to front wheels 90 and 92. For purposes of example, it is assumed that engine and transmission 82 is an internal combustion engine in which torque is controlled through control of the throttle (and fuel and spark timing). In this example, wheel speed is limited through application of brake pressure to apply the torque signaled by the closed loop torque commands so that the inner/outer wheel speed ratio is controlled.

The controller 55 determines an open loop torque command in response to an accelerator pedal position signal on line 36. The open loop torque command is fed to engine and transmission 82 through bus 79, controlling engine torque through control of engine throttle, fuel and spark timing. Wheel speed sensors 81 and 83 send wheel speed information through lines 93 and 95 to controller 55.

In response to the wheel speed information and to the steering wheel position signal on line 38, the controller determines the closed loop torque commands, $T_{rf}(t)$ and $T_{lf}(t)$, for front wheels 90 and 92 in accordance with this invention. The closed loop torque commands command, through lines 89 and 91, brake actuators 86 and 88, which, through hydraulic lines 85 and 87, selectively apply brake pressure to wheels 90 and 92 to control the speeds of wheels 90 and 92, as required by this invention.

Figure 8:
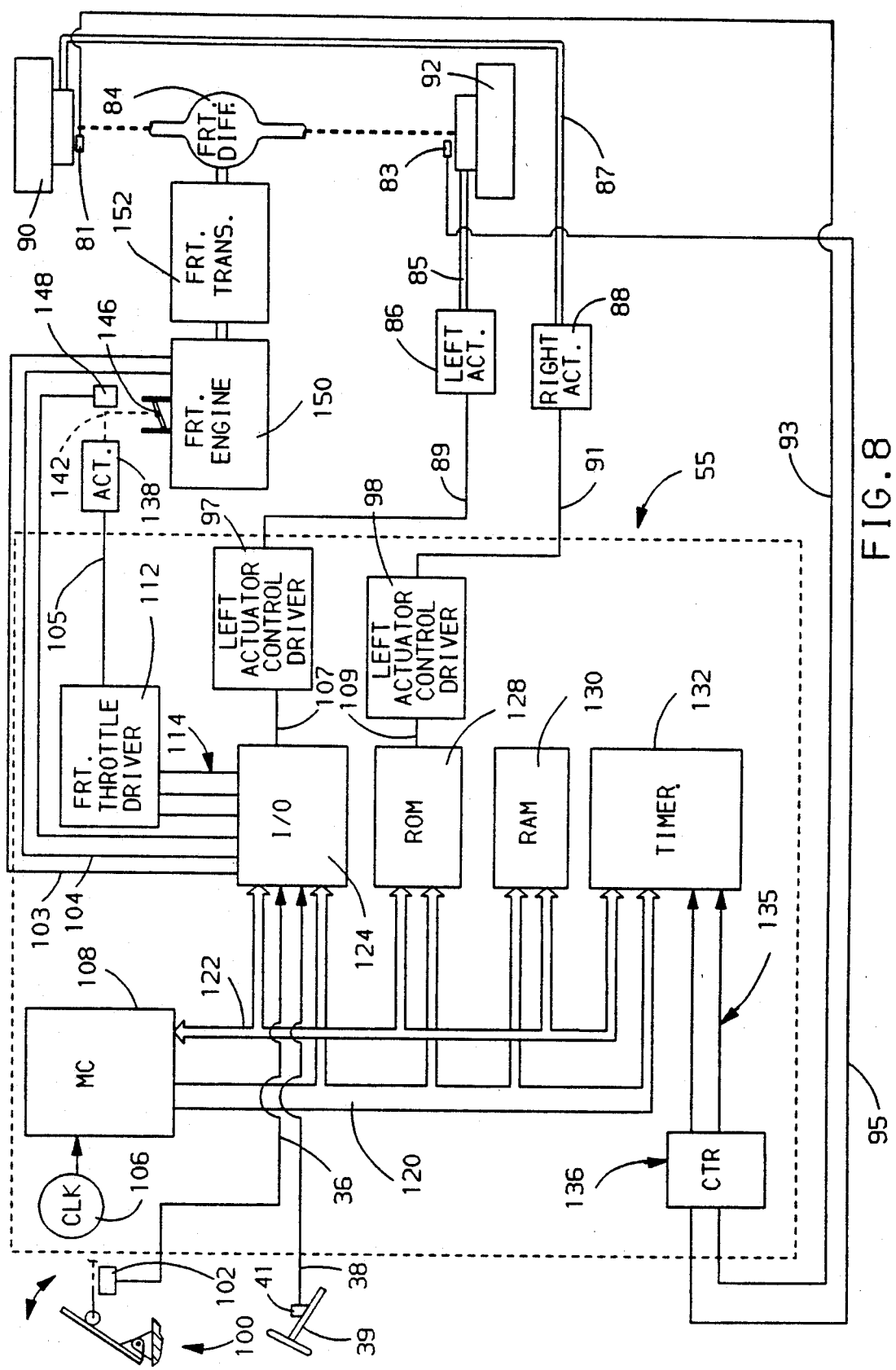
FIG. 8 is a schematic illustration of the controller and apparatus for the vehicle of FIG. 7.

Referring to FIG. 8, controller 55 operates similarly to controller 45 in FIG. 3. The front wheel speeds are sensed by sensors 81 and 83 and fed to counter 136 through lines 93 and 95. The counter 136 feeds the counter information through bus 135 to timer 132. The information from counter 136 and timer 132 is used to compute the speeds of wheels 90 and 92 and to approximate the vehicle velocity as described above.

The open loop torque command controls front throttle driver 112 through bus 114. The front throttle driver 112 applies a command through bus 105 to throttle actuator 138, which may be a DC stepper motor. Throttle actuator 138 controls the position of the throttle 146 of engine 150 through means 142, such as rotatable shaft. The torque delivered by engine 150 is transferred to front wheels 90 and 92 through transmission 152 and differential 84. If spark timing and fuel control are also desired to be implemented, lines 103 and 104 carry spark timing and fuel control commands to engine 150.

Figure 9:
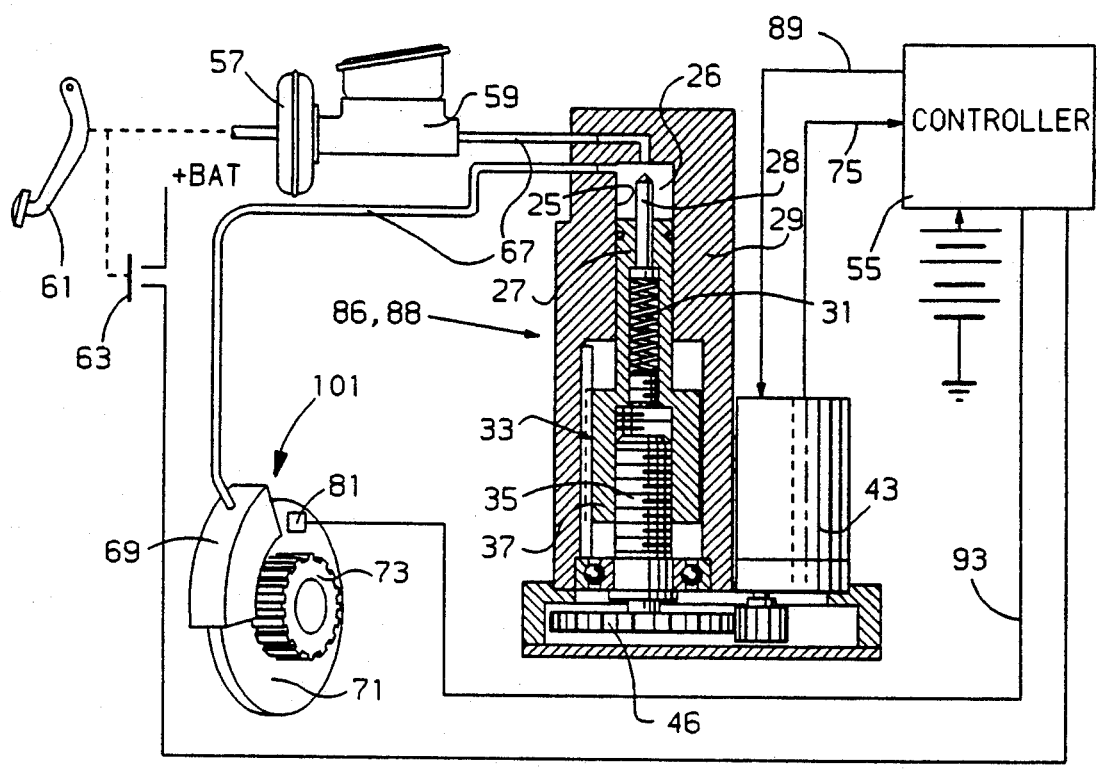
FIG. 9 is an illustration of the actuator of FIG. 8.

The closed loop torque commands $T_{rf}(t)$ and $T_{lf}(t)$ are carried through lines 107 and 109 to actuator control drivers 97 and 98, which control brake actuators 86 and 88 through lines 89 and 91. An example of a suitable actuator for actuators 86 and 88 is illustrated in FIG. 9 and described in detail in U.S. Pat. No. 4,946,015, issued Aug. 7, 1990, assigned to the assignee of this invention, and incorporated into this specification by reference.

Referring to FIG. 9, brake pedal 81 is connected to switch 63 and hydraulic booster 57. Hydraulic booster 57 and master cylinder 59 apply normal brake pressure to disk brake caliper 69 through hydraulic brake lines 67. Each wheel has a disk brake caliper 69. The rotor 71 of each wheel has attached thereon an exciter ring 73 providing a signal to the sensor 81 (or 83).

For understeer control, brake actuator 86 is controlled through a current command on line 89 to DC torque motor 68 whose output shaft drives a gear train 46 whose output turns a ball screw actuator 33 comprising a linear ball screw 35 and nut 37. As the linear ball screw rotates, the nut 37 is either extended or retracted thereby positioning a piston 27 which forms a part of the nut 37.

Each actuator includes a housing 29 in which a cylinder 25 is formed. The piston 27 is reciprocally received in the cylinder 25 and defines therewith a chamber 26. The cylinder 25 has an inlet which is connected to the master cylinder 59 and an outlet which is coupled to brake caliper 69 of the wheel brake.

A valve member 28 is carried by and extends from the end of the piston 27. This member is spring biased within the piston 27 to an extended position as shown by a spring 31. When the piston 27 is in the retracted position illustrated, the fluid path between the master cylinder 22 and wheel brake 101 is open. When, however, the ball screw 35 is rotated by the motor 43 to extend the nut 37 and therefore the piston 27, the valve member 28 is seated against the opening at the inlet to the chamber 26 from the master cylinder 59 to isolate the chamber 26 and wheel brake 101 from the master cylinder 59. Once the valve 28 is seated, further extension of the piston 27 by rotation of the motor 43 then functions to pressurize the fluid at the brake 101 to apply braking forces to the wheel.

The power consumed by the DC motor 43 while controlling pressure is directly proportional to the rotational torque exerted by the motor on the gear train 46. The rotational torque is translated through the linear ball screw and nut 35 and 37 to the piston 27. The pressure present at the piston head is proportional to the wheel brake pressure. Therefore, the value of the current through the DC motor 43 is proportional to the wheel brake pressure and can be considered a measure of the braking torque of the wheel. Line 75 may be implemented between motor 43 and controller 55 in the event feedback control of motor 43 is desired.

Switch 63 is used to signal the controller 55 to interrupt the understeer control of this invention in the event that the brake pedal 61 is depressed. When the brake pedal is depressed, actuator 86 (88) is de-actuated (no current to motor 43) for conventional braking, or used with one of any of the various types of traction control routines readily available to those skilled in the art and/or to provide anti-lock braking, whichever is preferred by the system designer.

In the implementation of this invention shown in FIGS. 7, 8 and 9, the effective drive torque of wheels 90 and 92 is the drive torque provided through differential 84 subtracted by the brake torque supplied by actuators 86 and 88 and brake units 101.

Figure 10:
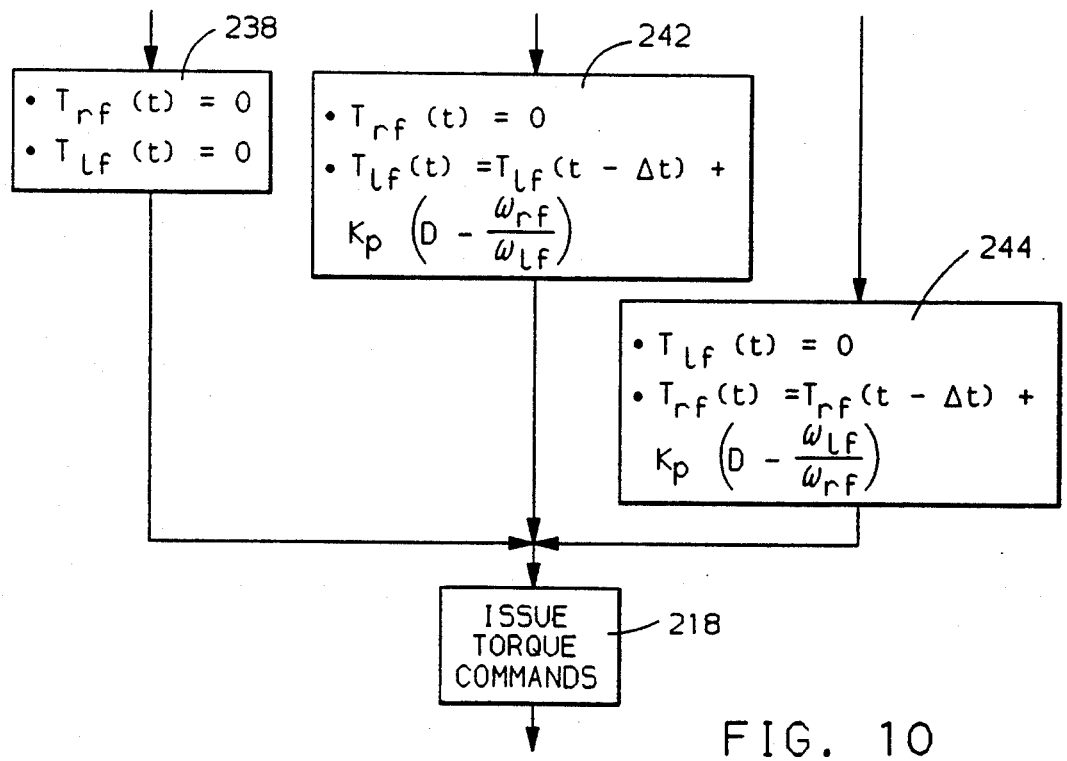
FIG. 10 is a flow diagram of a computer implementation of this invention for the examples shown in FIGS. 7, 8 and 9.

The control routine for the system shown in FIGS. 7, 8 and 9 varies slightly from that described above with reference to FIGS. 4, 5, and 6. The first difference is that only two wheel speeds ($\omega_{rf}$ and $\omega_{lf}$) are determined and only two closed loop torque commands, $T_{rf}(t)$ and $T_{lf}(t)$ are determined at blocks 238, 242 and 244 (FIG. 6). In addition, block 217 in FIGS. 5 and 6 is bypassed and the program proceeds directly to block 218, where the open loop torque command, $T_p$, is issued to control the engine 150 and the closed loop torque commands $T_{rf}(t)$ and $T_{lf}(t)$ are issued to control brake actuators 86 and 88 (see FIG. 10).

In the above example, engine and transmission 82 need not include internal combustion engine 150 and transmission 152 but may alternatively comprise an electric motor. In addition, the above example may well be suited for a vehicle with a front engine 82 and a rear engine which drives wheels 94 and 96 through a rear differential. In that case, controller 55 would compute an open loop torque command for the rear engine and closed loop torque commands which would operate rear brakes via rear brake actuators similar to actuators 86 and 88.

In the above illustrated examples, by calculating $R_d$ with $K_{ud}$, D from $R_d$, and the closed loop torque commands from D, understeer is substantially limited to understeer corresponding to $K_{ud}$. In this manner, understeer is kept within desirable limits.

The above illustrated examples are the preferred implementations of this invention and are not limiting on its scope. Moreover, various improvements and modifications to this invention may occur to those skilled in the art and will fall within the scope of this invention as set forth below.

The embodiments of the invention in which an exclusive property or privilege is claimed are defined as follows:

1. An improved vehicle steering control apparatus comprising:
    means for measuring an angle of a steering wheel positionable by a vehicle operator and for supplying a steering angle signal as an indication of the steering wheel angle;
    means for determining operator desired output torque and, in response thereto, for supplying a desired output torque signal;
    means for measuring wheel speeds of at least one inner wheel that is driven by means for supplying motive force and at least one outer wheel that is driven by the means for supplying motive force, the wheel speed measuring means supplying a wheel speed signal $\omega_i$ for each driven inner wheel and supplying a wheel speed signal $\omega_o$ for each driven outer wheel;
    means for determining an open loop torque command in response to the desired output torque signal;
    means for determining vehicle speed and for supplying a vehicle speed signal;
    means for determining a desired turning radius, $R_d$, in response to the vehicle speed signal and the steering angle signal and for supplying, as an indication of $R_d$, a desired turning radius signal;
    means for determining a desired outer wheel speed to inner wheel speed ratio signal, D, in response to the wheel speed signals;
    means for determining a closed loop torque command for each driven wheel in response to (i) a previously determined closed loop torque command, (ii) the steering angle signal, (iii) the desired outer wheel speed to inner wheel speed ratio signal, and (iv) the wheel speed signals, such that the closed loop torque commands equal zero if the steering angle signal indicates a steering angle of less than a predetermined threshold value, $\delta_{th}$, and such that the closed loop torque command for each driven outer wheel is zero and the closed loop torque command for each driven inner wheel is proportional to $(D - \omega_o/\omega_i)$ if the indicated steering angle is greater than $\delta_{th}$; and
    means for driving each of the driven wheels at an output torque equal to a sum of (i) torque indicated by the open loop torque command and (ii) torque indicated by the closed loop torque command for that wheel, whereby vehicle understeer is controlled to a desired level, improving vehicle handling during turning maneuvers.

2. The apparatus of claim 1, wherein the means for supplying motive force includes at least two DC electric motors, one motor for each driven wheel.

3. The apparatus of claim 2 wherein the DC electric motors are brushless DC electric motors.

4. The apparatus of claim 2, wherein the driving means comprises means for supplying a torque output command for each DC electric motor driving one of the driven wheels, the torque output command for each wheel comprising a sum of the open loop torque command and the closed loop torque command for that wheel and controlling the torque output of the DC electric motor.

5. The apparatus of claim 1 wherein:
    the driven wheels include right and left front wheels of the vehicle;
    the motive force means comprises an internal combustion engine supplying motive force to the right and left front wheels through a differential; and
    the torque for each driven wheel that is indicated by the closed loop torque command for that wheel is supplied to each wheel through a brake system with a controllable brake actuator.

6. In a vehicle with two right wheels and two left wheels where at least one right wheel and at least one left wheel are driven by electric motors, which are controlled by a controller, the improvement wherein the controller:
    receives input signals indicative of steering wheel angle, accelerator pedal position, and wheel speeds of the driven wheels;
    determines an open loop torque command in response to the signal indicative of accelerator pedal position;
    determines a measure of vehicle velocity;
    determines a desired turning radius in response to the signals indicative of steering wheel angle and the measure of vehicle velocity;
    determines a desired wheel speed ratio of the inner and outer driven wheels in response to the desired turning radius;
    compares the signal indicative of steering wheel angle to a threshold magnitude to determine if a magnitude of the steering wheel angle is greater than a threshold magnitude indicative of whether understear correction is desired and setting closed loop torque commands, one closed loop torque command for each electric motor, to zero if the magnitude of the steering wheel angle is not greater than the threshold;
    if the magnitude of the steering wheel angle is greater than the threshold, then (i) comparing the signal indicative of the steering wheel angle to a reference signal indicative to a zero degree turn to determine if the vehicle is turning right or left, (ii) when it is determined that the vehicle is turning left, setting the closed loop torque command for the electric motor corresponding to the right driven wheel equal to zero and setting the closed loop torque command for the electric motor corresponding to the left driven wheel proportional to a difference between the desired wheel speed ratio and an actual ratio of right to left driven wheel speed, and (iii) when it is determined that the vehicle is turning right, setting the closed loop torque command for the electric motor corresponding to the left driven wheel equal to zero and setting the closed loop torque command for the electric motor corresponding to the right driven wheel proportional to a difference between the desired wheel speed ratio and an actual ratio of left to right driven wheel speed;

determines torque commands for the driven wheels, the torque command for each driven wheel comprising the sum of the open loop torque command and the closed loop torque command for that wheel; and applies the torque commands to the motors driving the driven wheels, whereby the driven wheels are driven to yield a desired understeer level and improve vehicle handling through turning maneuvers.

7. In a vehicle with two right wheels and two left wheels where at least one right wheel and at least one left wheel are driven by an electric motor through a differential, the motor controlled by a controller, the improvement wherein the controller:

receives input signals indicative of steering wheel angle, accelerator pedal position, and wheel speeds of the driven wheels;

determines an open loop torque command in response to the signal indicative of accelerator pedal position;

determines a measure of vehicle velocity;

determines a desired turning radius in response to the signals indicative of steering wheel angle and the measure of vehicle velocity;

determines a desired wheel speed ratio of the inner and outer driven wheels in response to the desired turning radius;

compares the signal indicative of steering wheel angle to a threshold magnitude to determine if a magnitude of the steering wheel angle is greater than a threshold magnitude indicative of whether understear correction is desired and setting closed loop torque commands, one closed loop torque command for each driven wheel, to zero if the magnitude of the steering wheel angle is not greater than the threshold magnitude;

if the magnitude of the steering wheel angle is greater than the threshold magnitude, then (i) comparing the signal indicative of the steering wheel angle to a reference signal indicative of a zero degree turn to determine if the vehicle is turning right or left, (ii) when it is determined that the vehicle is turning left, setting the closed loop torque command for the right driven wheel equal to zero and setting the closed loop torque command for the left driven wheel proportional to a difference between the desired wheel speed ratio and an actual ratio of right to left driven wheel speed, and (iii) when it is determined that the vehicle is turning right, setting the closed loop torque command for the left driven wheel equal to zero and setting the closed loop torque command for the right driven wheel proportional to a difference between the desired wheel speed ratio and an actual ratio of left to right driven wheel speed;

applies the open loop torque command to the motor, controlling output torque of the motor and, therefore, controlling torque supplied to the driven wheels through the differential;

applies the closed loop torque commands to brake actuators that apply braking torque to the driven wheels in response to said closed loop torque commands, whereby each wheel outputs a torque equal to the torque supplied through the differential subtracted by the braking torque to that wheel, and whereby the driven wheels are driven to maintain the desired vehicle understeer and improve vehicle handling through turning maneuvers.

8. In a vehicle with two right wheels and two left wheels where at least one right wheel and at least one left wheel are driven by an internal combustion engine through a differential, the engine controlled by a controller, the improvement wherein the controller:

receives input signals indicative of steering wheel angle, accelerator pedal position, and wheel speeds of the driven wheels;

determines an open loop torque command in response to the signal indicative of accelerator pedal position;

determines a measure of vehicle velocity;

determines a desired turning radius in response to the signals indicative of steering wheel angle and the measure of vehicle velocity;

determines a desired wheel speed ratio of the inner and outer driven wheels in response to the desired turning radius;

compares the signal indicative of steering wheel angle to a threshold magnitude to determine if a magnitude of the steering wheel angle is greater than a threshold magnitude indicative of whether understeer correction is desired and setting closed loop torque commands, one closed loop torque command for each driven wheel, to zero if the magnitude of the steering wheel angle is not greater than the threshold magnitude;

if the magnitude of the steering wheel angle is greater than the threshold magnitude, then (i) comparing the signal indicative of the steering wheel angle to a reference signal indicative of a zero degree turn to determine if the vehicle is turning right or left, (ii) when it is determined that the vehicle is turning left, setting the closed loop torque command for the right driven wheel equal to zero and setting the closed loop torque command for the left driven wheel proportional to a difference between the desired wheel speed ratio and an actual ratio of right to left driven wheel speed, and (iii) when it is determined that the vehicle is turning right, setting the closed loop torque command for the left driven wheel equal to zero and setting the closed loop torque command for the right driven wheel proportional to a difference between the desired wheel speed ratio and an actual ratio of left to right driven wheel speed;

applies the open loop torque command to the engine, controlling output torque of the engine and, therefore, controlling torque supplied to the driven wheels through the differential;

applies the closed loop torque commands to brake actuators that apply braking torque to the driven wheels in response to said closed loop torque commands, whereby each wheel outputs a torque equal to the torque supplied through the differential subtracted by the braking torque to that wheel, and whereby the driven wheels are driven to maintain the desired vehicle understeer and improve vehicle handling through turning maneuvers.

* * * * *